US010189586B2

(12) United States Patent
Hartwig

(10) Patent No.: US 10,189,586 B2
(45) Date of Patent: Jan. 29, 2019

(54) PROCESS FOR SINGLE-STEP FORMING AND FILLING OF CONTAINERS

(75) Inventor: Klaus Hartwig, Nancy (FR)

(73) Assignee: DISCMA AG, Zürich (CH)

( * ) Notice: Subject to any disclaimer, the term of this patent is extended or adjusted under 35 U.S.C. 154(b) by 771 days.

(21) Appl. No.: 13/992,901

(22) PCT Filed: Dec. 7, 2011

(86) PCT No.: PCT/EP2011/072011
§ 371 (c)(1),
(2), (4) Date: Jun. 10, 2013

(87) PCT Pub. No.: WO2012/076576
PCT Pub. Date: Jun. 14, 2012

(65) Prior Publication Data
US 2013/0326998 A1    Dec. 12, 2013

(30) Foreign Application Priority Data

Dec. 10, 2010 (EP) .................................. 10194546

(51) Int. Cl.
*B65B 3/02* (2006.01)
*B29B 11/14* (2006.01)
(Continued)

(52) U.S. Cl.
CPC .............. *B65B 3/022* (2013.01); *B29B 11/14* (2013.01); *B29C 49/0073* (2013.01);
(Continued)

(58) Field of Classification Search
CPC ............. B29B 11/14; B29B 2911/1402; B29B 2911/14026; B29B 2911/14033;
(Continued)

(56) References Cited

U.S. PATENT DOCUMENTS 4,025,594 A * 5/1977 Agrawal ............. B29C 49/0005
264/235
4,144,298 A * 3/1979 Lee ..................... B29C 49/0005
264/532
(Continued)

FOREIGN PATENT DOCUMENTS

DE         2849463      5/1980
DE     102008013419    9/2009
(Continued)

*Primary Examiner* — Thanh Truong
*Assistant Examiner* — Thomas Wittenschlaeger
(74) *Attorney, Agent, or Firm* — Eric J. Sosenko; Jonathan P. O'Brien; Honigman Miller Schwartz and Cohn LLP

(57) ABSTRACT

A process for the manufacturing and filling of plastic containers, the process comprising the steps of:
  positioning a preform with relation to a mold assembly of two or more components, the preform generally being fabricated from a plastic and being provided with a longitudinal axis and presenting a stretchable portion and a non-stretchable portion;
  stretching the preform along its longitudinal axis;
  injecting a fluid into the interior volume of the preform, the fluid being under such pressure as to cause the preform to plastically deform until achieving the desired size and shape; and
  releasing the container from the mold assembly and sealing the container, and in which at least a portion of the stretchable portion of the perform is at a temperature below its vitreous transition temperature (Tg) and, preferably, at ambient temperatures.

16 Claims, 3 Drawing Sheets

(51) Int. Cl.
  *B29C 49/00*   (2006.01)
  *B29C 49/46*   (2006.01)
  *B29C 49/78*   (2006.01)
  *B29C 67/00*   (2017.01)
  B29C 49/12        (2006.01)
  B29K 23/00        (2006.01)
  B29K 67/00        (2006.01)
  B65B 7/28         (2006.01)

(52) U.S. Cl.
  CPC .............. *B29C 49/46* (2013.01); *B29C 49/78* (2013.01); *B29C 67/0029* (2013.01); *B29B 2911/1402* (2013.01); *B29B 2911/1404* (2013.01); *B29B 2911/14026* (2013.01); *B29B 2911/14033* (2013.01); *B29B 2911/1444* (2013.01); *B29B 2911/1448* (2013.01); *B29B 2911/14106* (2013.01); *B29B 2911/14133* (2013.01); *B29B 2911/14326* (2013.01); *B29B 2911/14333* (2013.01); *B29C 49/12* (2013.01); *B29C 2049/1257* (2013.01); *B29C 2049/4664* (2013.01); *B29K 2023/065* (2013.01); *B29K 2023/12* (2013.01); *B29K 2067/00* (2013.01); *B29K 2067/003* (2013.01); *B65B 7/2835* (2013.01); *Y10T 428/1352* (2015.01)

(58) Field of Classification Search
  CPC ... B29B 2911/1404; B29B 2911/14106; B29B 2911/14133; B29B 2911/14326; B29B 2911/14333; B29B 2911/1444; B29B 2911/1448; B29C 49/0073; B29C 49/46; B29C 49/78; B29C 49/12; B29C 67/0029; B29C 2049/1257; B29C 2049/4664; B65B 3/022; B65B 7/2835; B29K 2023/065; B29K 2023/12; B29K 2023/00; B29K 2023/003; Y10T 428/1352
  See application file for complete search history.

(56) References Cited

U.S. PATENT DOCUMENTS

| | | | |
|---|---|---|---|
| 4,927,680 | A | 5/1990 | Collette et al. |
| 6,841,262 | B1 | 1/2005 | Beck et al. |
| 6,946,092 | B1* | 9/2005 | Bertolino .......... A61M 25/1029 264/512 |
| 2008/0038495 | A1 | 2/2008 | Kuhn et al. |
| 2008/0260888 | A1* | 10/2008 | Freire-Diaz ............. B29C 49/56 425/541 |
| 2009/0218733 | A1* | 9/2009 | Andison ................. B29C 49/46 264/525 |
| 2011/0037189 | A1* | 2/2011 | Balkau .................... B29C 49/78 264/40.3 |

FOREIGN PATENT DOCUMENTS

| | | |
|---|---|---|
| EP | 0201851 | 11/1986 |
| EP | 1529620 | 5/2005 |
| EP | 1849578 | 10/2007 |
| EP | 2062711 | 5/2009 |
| EP | 2143542 | 1/2010 |
| JP | S58209533 | 12/1983 |
| JP | H0531792 | 2/1993 |
| JP | 2000043129 | 2/2000 |
| WO | 9948669 | 9/1999 |
| WO | 2009075791 | 6/2009 |

* cited by examiner

PROCESS FOR SINGLE-STEP FORMING AND FILLING OF CONTAINERS

CROSS REFERENCE TO RELATED APPLICATIONS

The present application is a National Stage of International Application No. PCT/EP2011/072011, filed on Dec. 7, 2011, which claims priority to European Patent Application No. 10194546.7, filed Dec. 10, 2010, the entire contents of which are being incorporated herein by reference.

FIELD OF THE INVENTION

This invention relates to a method for the manufacturing and filling of plastic containers. More particularly, the invention concerns the art of forming containers by the use of heated, pressurized air to expand a preform which has already been fabricated by injection molding, for example.

BACKGROUND

The above-mentioned technique is commonly known in the plastics-forming art as "blow molding". In particular, blow molding is a commonly-employed technique for the formation of containers, such as those for food, beverages, or chemicals. Common plastic resins for blow molding include Polyethylene Terephthalate (PET), High-Density Polyethylene (HDPE), and Polypropylene (PP), though other resins with properties suitable to the process and application may be employed.

A typical feedstock for a blow molding process is a hollow thermoplastic preform of generally tubular shape created by means of injection molding. Said preform is generally closed on one end, leaving the other end open, having the appearance of a test tube or similar container. The open end of the preform is generally in a form that is substantially finished, optionally including such features as threads, spouts, etc. However, the preform may be left open and unfinished at both ends, with closure and features to be added later.

In a typical blow molding process, the preform is first pre-heated, generally by use of ovens or radiant heaters. The temperature to which the preform is heated is one above the vitreous transition point of the material. This renders the preform soft and pliable, and thus capable of flowing into the recesses of a mold. The working temperature of a blow molding process thus ranges from 55° C. to 135° C., depending on the properties of the material used.

The preform, once uniformly heated to the desired temperature, is positioned within a mold. The cavity of the mold is contoured in such a way as to delineate the exterior of the finished container. The neck at the open end of the preform generally protrudes from the top of the mold. A stretch rod is inserted into the opening of the preform, and about the opening of the preform the blow molding apparatus is positioned. During molding, the stretch rod is advanced into the preform in such a way as to press into the closed end of the preform and deform it in the direction of its longitudinal axis. Simultaneously, air under high pressure is blown into the preform, causing the preform to expand and fill the mold cavity. The container is then cooled, which is accomplished either by circulating coolant through the mold body before the container is ejected, or by injecting a cryogenic fluid such as liquid nitrogen into the container. Once it has sufficiently cooled, the container is removed from the mold, filled with a product and sealed.

The present method as described above is disadvantageous in several aspects. First, the plastic preform must be pre-heated, in order to maintain the plastic at the proper temperature for forming, a step which adds considerable cost to the process in the form of energy costs. These costs are of even greater concern in high-volume operations, wherein large quantities of preforms must be brought to working temperature very rapidly and large installations of heating equipment are required. Second, as the containers are molded using gas, control over the molding process is diminished by the compressibility of the gas. Third, the container must be cooled after molding and may not be filled until its temperature has decreased sufficiently, which limits the speed at which a blow-molding apparatus may operate and generally adds another layer of complexity and expense to the process. Fourth, as the temperature of the plastic is maintained above the material's vitreous transition point during the forming process, the molecular structure of the finished container remains largely amorphous, and does not benefit from the increases in strength and other physical properties that are the result of crystallization and strain hardening.

SUMMARY OF THE INVENTION

An object of this invention may be to reduce the amount of energy that is required to complete the process by reducing the amount of heating of the preform prior to molding.

A further object of this invention may be to provide the preform with alternate means of achieving the material flow in the absence of heating above the material's vitreous transition point.

A further object of this invention may be to provide means by which the cycle time of a container blow molding and filling operation may be reduced.

A further object of this invention may be to improve the present means of control over the blow molding process, through reducing or eliminating the inaccurate and uncontrollable aspects of the gaseous fluid injection present in current blow molding techniques.

A further object of this invention may be to improve the crystalline structure of the containers produced by a blow-molding process, by increasing the crystallinity of the containers yielded by such a process.

According to a first aspect, the invention is directed to a new process as defined in claim 1. Correlatively, the invention also relates to a new system for the manufacturing and filling of plastic containers as defined in claim 15. According to a further aspect, the fluid is an incompressible fluid. The process and system in accordance with this further aspect are advantageous in that the expansion of the preform is achieved through the use of an incompressible fluid, rather than air. This is advantageous in that it avoids the unpredictability and variance present in the control of the volume and pressure of a gas that is being injected into an expanding preform. For instance, the preform may be fabricated from a thermoplastic resin.

According to a further aspect of the invention, the steps of stretching the preform and injecting the fluid are performed substantially sequentially. This has the advantage of permitting the practitioner of the invention to have greater control over the molding process by means of separating the process into distinct, controllable steps. This also better allows the practitioner of the invention to optimize the molding process to a particular container design: as the molding occurs in several distinct steps, the practitioner is better able to isolate the cause of a particular defect to a certain step in the process, and accordingly correct it.

According to an alternate aspect of the invention, the steps of stretching the preform and injecting the fluid are performed simultaneously. This has the advantage of speeding up the molding process relative to a process which uses sequential stretching and injection, thereby increasing the capacity of a blow-molding operation.

According to still another aspect of the invention, the steps of stretching the perform and injecting the fluid are performed substantially sequentially with the start of the injection step occurring before the end of the stretching step. This combines the advantages of both previous aspects of the invention in that the starts of each step are shifted in time and therefore constitute distinct, controllable steps. Further, since the start of the injection step does not wait for the occurrence of the end of the stretching step, gain of time in the manufacturing process is thereby obtained.

In a further aspect of the invention, the fluid (e.g. an incompressible fluid) which is used to effectuate the molding of the container is that which will be enclosed by the container and distributed to customers. This is advantageous in that it eliminates the capital expense and increased process time associated with acquiring and operating separate molding and filling apparatuses. At the same time, the process of sterilization of the container is greatly improved, since in this process it is the preform which is sterilized and not the finished container. Specifically, the preform's smaller size and simpler geometry (relative to the finished container) allow the sterilization process to be performed much more quickly than in existing methods. This aspect may also optionally encompass a step wherein a seal is applied to the container after the completion of the molding process, such as those commonly employed to prevent spoilage or tampering.

According to another aspect, the fluid is at ambient temperatures. This makes it possible to dissipate heat generated by the stretching step. Also, this is advantageous in that no energy is wasted for heating or cooling the fluid which can be used as such, as it is stored or available from a fluid source (at ambient temperature).

It is a further aspect of the invention that the amount of energy required by the process is greatly reduced relative to current methods. This reduction in energy results in a considerable per-unit and overall cost savings. Said reduction is achieved by performing the blow-molding operation with the preform at a temperature that is below its vitreous transition temperature (Tg) and, preferably, at ambient temperatures. This aspect of the invention has an advantage in the fact that, owing to the limited or even non heating prior to molding the preform, the post-molding cooling time is greatly reduced or even eliminated. This reduces total cycle time and increases the capacity of a given blow-molding operation, resulting in economic benefits to the manufacturer of the containers. Advantageously, at least a portion of the preform and more specifically the portion of the preform that can be stretched during the process is at a temperature below its vitreous transition temperature (Tg), most preferably, at ambient temperature. Accordingly, at least 30%, preferably at least 50%, more preferably at least 70%, most preferably 90% of the stretchable portion of the preform is at a temperature below its vitreous transition temperature (Tg) prior to stretching of the preform.

Preferably, during the process of manufacturing and filling of the plastic containers, the preform is at ambient temperature and at least a zone of the stretchable portion of the preform presenting decreased cross sectional area can be heated to facilitate initiation of deformation during the molding.

The invention is also directed to a preform in accordance with claim 10, which is intended for use in the aforementioned blow-molding process. The preform is provided with one or several zones of decreased cross-sectional area, which are positioned along the longitudinal axis of the preform. Said zones of decreased cross-sectional area act as concentrators of longitudinal and radial stresses, resulting in the consistent initiation of plastic deformation in said zones during molding. The decrease in cross-sectional area of the zone or zones may be achieved by means of smooth geometry changes along the preform's longitudinal axis (e.g. curved geometry), sharp corners along the preform's longitudinal axis (e.g. angular geometry), or a combination thereof.

It is accordingly a further aspect of the invention that the crystallinity of the finished container is increased relative to that found in containers produced by methods according to the prior art. This increase in crystallinity is a result of the fact that in the blow-molding process the preform is molded at a temperature that is below the vitreous transition temperature (Tg) for the material of which it is fabricated. This is made possible thanks to the use of an incompressible fluid which has good heat conduction properties (e.g. water, in particular, has high heat conduction properties) and, therefore, quickly dissipates the heat produced by the stretching step. Thus, crystallinity at a high level (30-35%) may be obtained with water as incompressible fluid. This results in improved strain hardening during the molding process, as the act of deforming the preform into the desired shape encourages the plastic resin molecules to align and crystallize. This increase in crystallinity results in improved mechanical and chemical properties in the finished container.

Another object of the invention, according to claim 13, is a method of controlling the process for the manufacturing and filling of plastic containers as briefly described above. This method is advantageous because, in combination with any of the other aspects of the invention, it permits the practitioner of the invention to optimize process control and throughput through use of automated process control systems.

DESCRIPTION OF THE PREFERRED EMBODIMENT

The invention will be better understood from the description which follows, which relates to a preferred embodiment, given by way of non-limiting example, and explained with reference to the accompanying FIGS. 1-4 showing a preform and molding apparatus, according to this invention.

Figure 1:
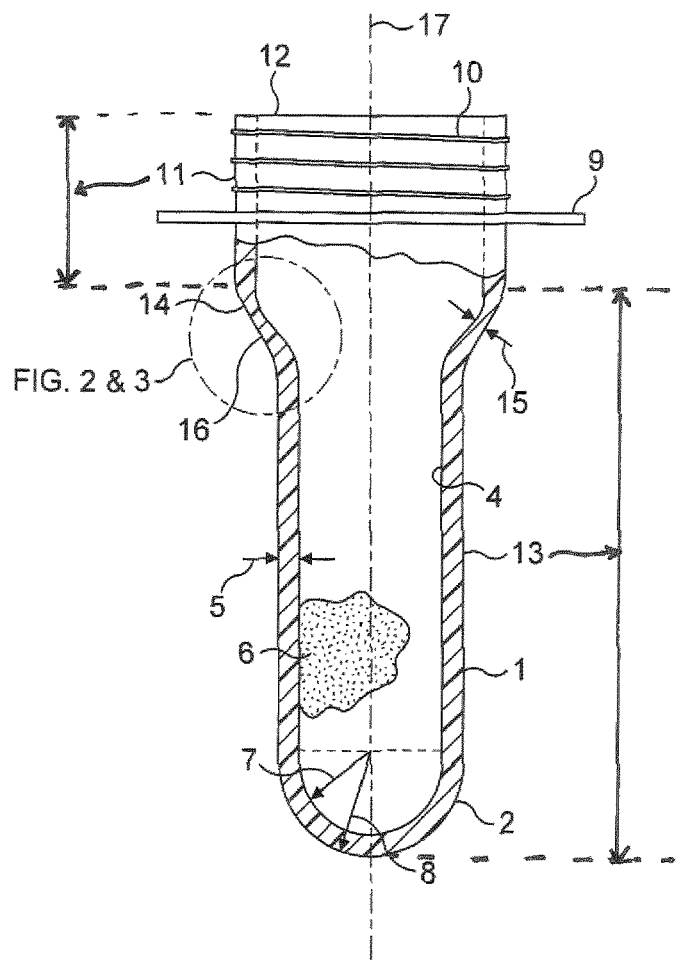
FIG. 1 is a diagram of a preform for use in the invention, including an indication of separate detailed views in FIGS. 2 & 3.

The process for blow-molding containers from plastic, and more particularly from thermoplastic resin, e.g. PET, starts with the preform 1 shown in FIG. 1. In the preferred embodiment, the preform 1 is fabricated of PET resin in a conventional injection-molding process. Preform 1 is ideally axially symmetric about the longitudinal axis 17. The preform 1 is a tubular body of a generally elongated shape, composed of an upper portion 11 and a lower portion 13. The lower portion 13 of preform 1 is defined generally by an outer surface 3 and an inner surface 4, together forming a wall of thickness 5. Said thickness 5 is not necessarily fixed; it may vary slightly along the body of the preform 1 (in the longitudinal direction) as is needed to optimize the molding of the finished container. The upper portion 11 of preform 1 is provided with a shoulder 9, threading 10, and an opening 12, arranged in such a way as to provide a ready fitment for a cap. A neck 14 comprises the transition between upper portion 11 and lower portion 13.

The upper portion 11 is a portion that is not stretched during the process of manufacturing the container and during the step of stretching the preform 1 along its longitudinal axis. It is therefore designated as a non-stretchable portion. On the contrary, the lower portion 13, is defined as a stretchable portion and is stretched and deformed until achieving the desired size and shape for the container.

The preform 1 is further defined by a bottom portion 2, which comprises a hemispherical shell of inner radius 7 and outer radius 8. The effect of the combination of the bottom section 2 with the upper portion 11 and the lower portion 13 is to render the preform a tubular structure which defines an interior volume 6.

Figure 2:
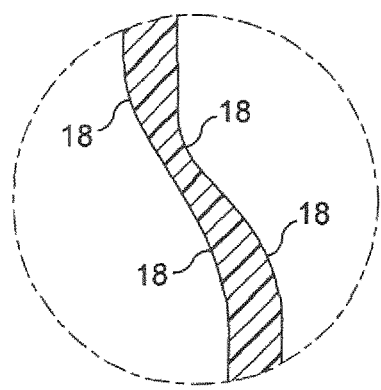
FIG. 2 is a detailed view of a deformation zone on the preform of FIG. 1, where the zone is comprised of curved geometry.
Figure 3:
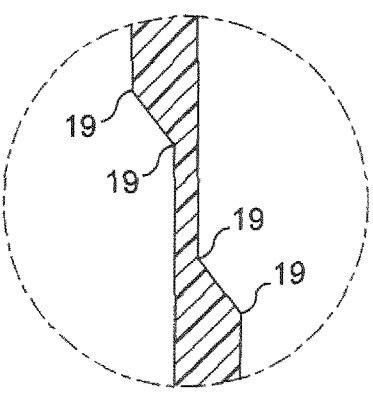
FIG. 3 is an alternative detailed view of a deformation zone on the preform of FIG. 1, where the zone is comprised of angular geometry.

The neck 14 is provided with a zone 16 that has a locally-reduced wall thickness 15 relative to the rest of the preform 1. Zone 16 is a concentrator of axial and radial stress in the wall of preform 1, serving to provide a consistent point of initiation of deformation during molding and thus facilitate the flow of preform 1 during molding. FIGS. 2 & 3 show two possible configurations of the decreased thickness 15. In FIG. 2, the decreased thickness 15 is accomplished by means of smooth curves 18, which may be of constant or variable radius. In FIG. 3, the preform is instead provided with angles 19 (sharp corners), which accomplish the same purpose as curves 18. While in the preferred embodiment only one such zone 16 is employed, multiple such zones may optionally be employed, depending on the properties of the material used and the geometry of the container being formed.

Preferably the preform taken as a whole is at ambient temperature. More specifically, at least a portion of the stretchable portion of the preform is at ambient temperature and most preferably, at a temperature below the vitreous transition temperature (Tg) of the preform.

As proposed, at least 30%, preferably at least 50%, more preferably at least 70%, most preferably 90% of the stretchable portion of the preform is at a temperature below its vitreous transition temperature (Tg) prior to stretching of the preform.

However, to facilitate the stretching of the stretchable portion of the preform along its longitudinal axis, it is planned to locally heat the stretchable portion in some points. Advantageously, the preform can be heated at the location of zones 16 presenting the locally reduced wall thickness 15 to initiate the deformation of the stretchable portion during the molding. Zone 16 can be heated at a temperature approaching the vitreous transition temperature (Tg) or above the vitreous transition temperature (Tg) while the preform taken as a whole remains at a temperature below the vitreous transition temperature (Tg) and preferably at ambient temperature.

Figure 4:
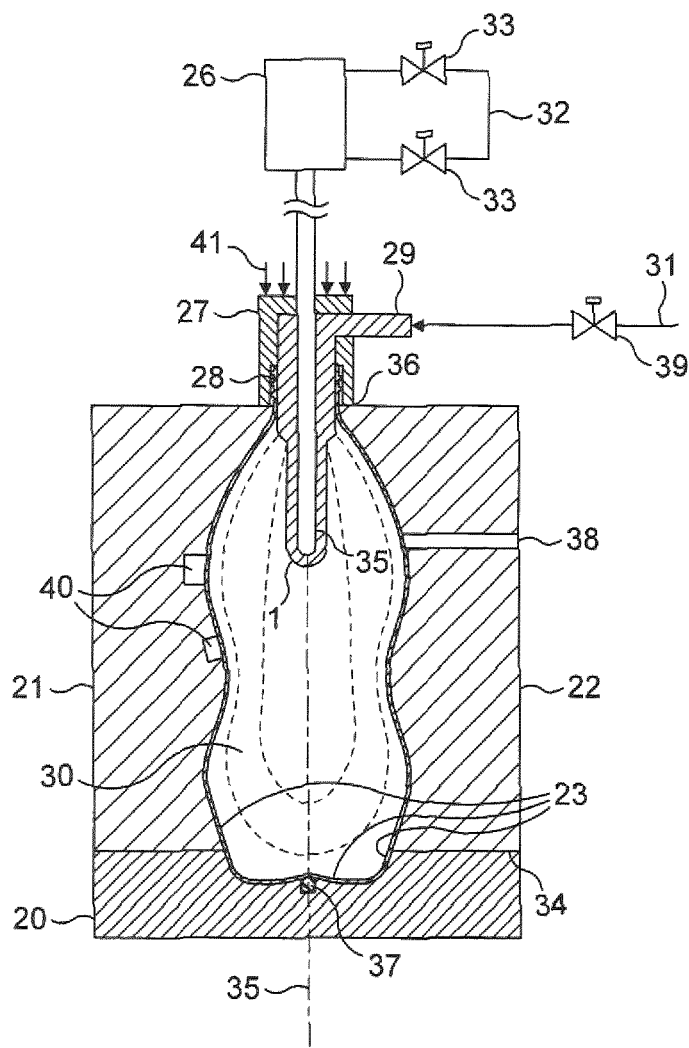
FIG. 4 is a diagram of an apparatus in which the invention may be implemented.

FIG. 4 depicts the preferred embodiment of an apparatus to effectuate the molding process. The apparatus comprises a mold, having a base 20 and left and right halves 21 and 22 (collectively, the mold components), and a forming head 27 with a stretching element such as a stretching rod 25 driven by cylinder 26. The mold halves 21 and 22 meet along the mold centerline 35, and abut the mold base 20 along the mold base seam 34. The mold cavity 30 is thus defined by the inside surfaces 23 of the mold components. It is to be noted that a mold with a different number of components may alternatively be used. The mold may be further provided with one or more vent ports 38, to exhaust air displaced by the preform 1 during the molding operation.

The mold halves 21 and 22 are provided with an upper orifice 36. The orifice 36 is of a size such that the preform neck 14 may pass through the orifice 36 while the preform shoulder 9 rests upon the upper surface of the mold halves 21 and 22. The result is that the preform's lower portion 13 is positioned within the mold cavity 30 while the preform's upper portion 11 rests outside the mold cavity.

Before the molding operation, the preform 1 is prepared for the molding process. In the preferred embodiment, the preform is cleaned of any latent residues and sanitized to prevent spoilage of its future contents. Preferably, the preform is at ambient temperature. The prepared preform 1 is positioned relative to the mold components 20, 21, and 22 in such a way as to be enclosed as described above. In practical terms, the preform 1 is inserted into the assembled mold structure, or alternately the preform 1 may be held in position while the mold components are brought together and closed around it. Once properly positioned the mold components are held in position by means of clamps or locking devices. The apparatus together with the preform 1 form a system for the manufacturing and filling of plastic containers. The forming head 27 is then positioned about the mouth 28 of the preform 1 and held in position by the application of external force 41. The forming head 27 may optionally be provided with means for engaging the preform threads 10 for an improved connection and seal.

During preparation of the molding operation, the preform 1 is at ambient temperature or at least at a temperature below its vitreous transition temperature (Tg).

Local zones 16 of the stretchable portion 13 of the preform can be heated at a temperature approaching its vitreous transition temperature (Tg) or above the vitreous transition temperature (Tg) of the preform 1 to help initiating plastic deformation of the preform 1 during the molding operation.

The molding operation is commenced by the advancement of the stretch rod 25 into the interior volume 6 of the preform, causing it to plastically deform by stretching it along its longitudinal axis 17. The stretching rod 25 is driven by means of pneumatic cylinder 26, which is operated by compressed air supplied from source 32 and regulated by valves 33. Alternatively, other driving means may be used for driving the displacement of the stretching element. This deformation continues until the stretching rod 25 meets the mold bottom 20 at the bottom point 37, at which point the stretching rod 25 is halted and held in place until the completion of the molding operation.

While the stretching rod 25 is deforming the preform by stretching, an incompressible fluid 29 under pressure, e.g.

water, supplied from source 31 and regulated by valve 39 is injected into the preform interior volume 6. More particularly, the injection begins after the stretching has started and before it has come to an end. This makes it possible to obtain a regular distribution of cristallinity along the preform height. It is to be noted that stretching a PET preform that is initially rather in an amorphous form, induces cristallinity in the preform. However, heat generated by the stretching step breaks this induced cristallinity. The use of an incompressible fluid, in particular a fluid with good or even high heat conduction properties, such as water, makes it possible to evacuate heat produced by the stretching step and keep cristallinity at rather a high level, e.g. between 30 and 35%. Furthermore, for cristallinity purpose water is used at ambient temperature in the injection step. However, other fluids (e.g. liquid) may, alternatively, be used, and in particular fluid with any temperature between 0° and 100° C. A means for removing air from the inside of the preform 1 before the injection of the incompressible fluid 29 may optionally be provided. The longitudinal stress induced by the stretching rod 25 and the longitudinal and radial stresses induced by the pressure of the incompressible fluid 29 causes plastic deformations to be initiated at the stress concentrators found in the preform 1 at the zones 16.

Once plastic deformation is initiated, the preform 1 continues to expand into the mold cavity 30 until it has assumed approximately the shape of the mold inside surfaces 23. This expansion is monitored by the apparatus' control systems by means of appropriately-located sensors 40. The exact number of sensors 40 required will vary according to the shape of the mold cavity 30; only two are depicted here for clarity. It is to be noted that control over the molding process is obtained by controlling the volume increase rate within the mold during the process. Controlling the volume of an incompressible fluid (e.g. water) injected into the preform (e.g. through a flow meter or another suitable means) is much easier than for a compressible fluid such as air. Controlling the volume increase rate makes it possible to control the surface increase rate during the expansion of the preform within the mold. The volume increase rate is monitored in such a way as to obtain a substantially constant PET bubble surface increase rate, thereby tending to obtain the maximum cristallinity as possible in the PET preform.

As explained, during the manufacturing process, the container is performed with a preform 1. At least a portion of the stretchable portion 13 of said preform is at a temperature that is below the vitreous transition temperature Tg for the material of which it is produced and, preferably at ambient temperature.

According to the proposed process, at least 30%, preferably at least 50%, more preferably at least 70% and most preferably 90% of the stretchable portion 13 of the preform 1 is at a temperature below its vitreous transition temperature (Tg), allowing a reduction in the energy required in the process.

Figure 6:
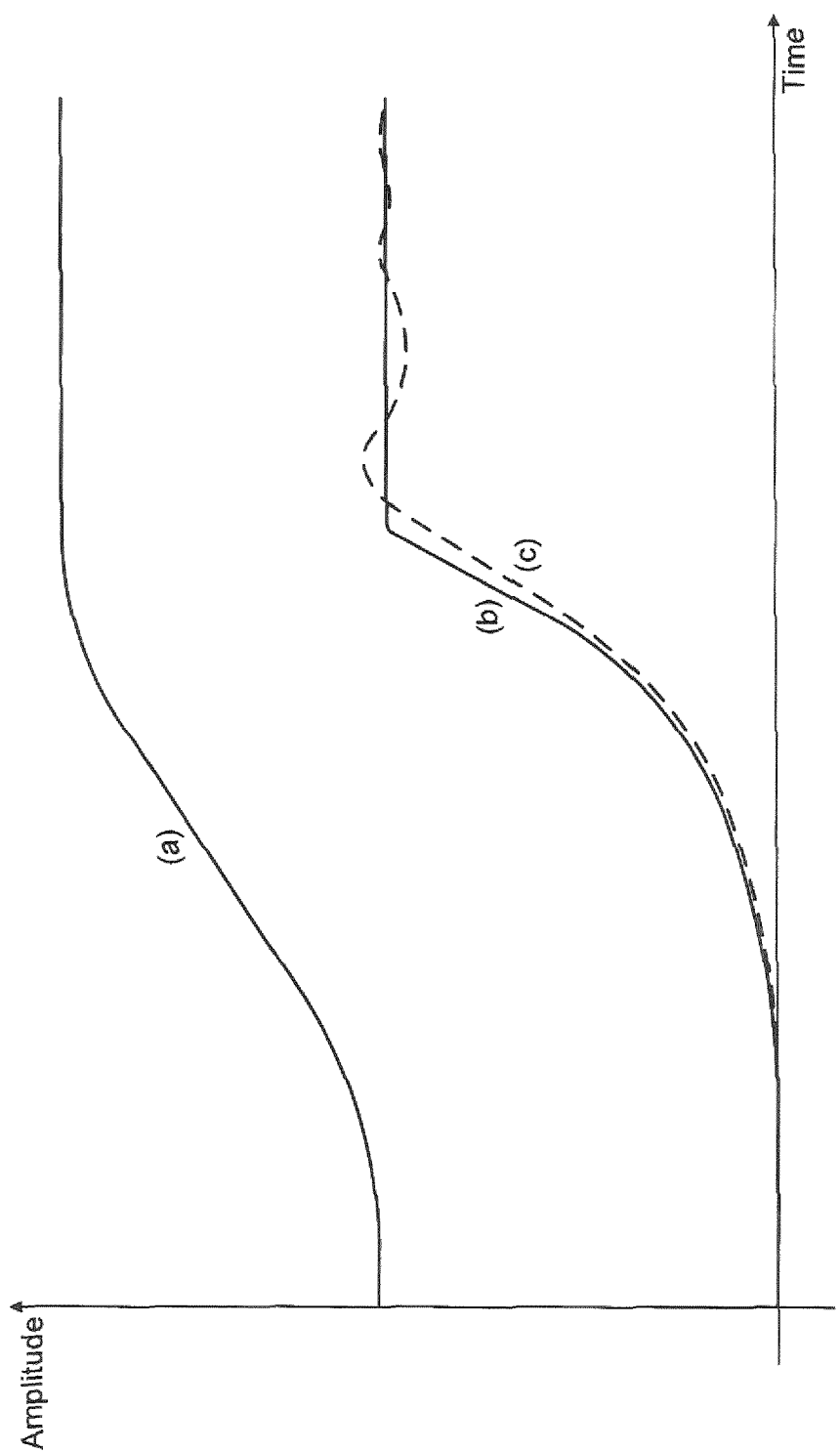
FIG. 6 schematically illustrates experimental curves obtained through an example of a process according to the invention.

FIG. 6 illustrates schematic curves (a), (b), and (c) obtained in the course of implementation of an example of a manufacturing process according to the invention.

Curve (a) represents the amplitude of the stretching position over time during the molding process.

Curve (b) represents the amplitude of the volume of an incompressible fluid, e.g. water, which is injected into the preform while the latter is being stretched. As apparent from the drawing, the fluid starts to be injected while the preform stretching is in progress.

Lastly, curve (c) in dotted lines represents the amplitude of a setpoint of water volume.

Figure 5:
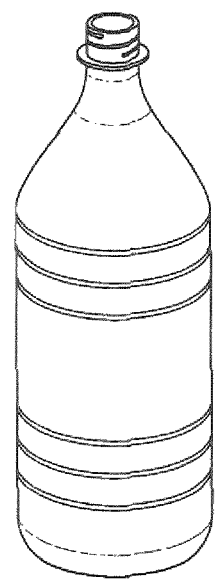
FIG. 5 is a depiction of a finished container produced by the process according to the invention.

Once the expansion has come to an end the mold halves 21 and 22 are then opened and the container is removed without emptying the incompressible fluid 29. The container is finally sealed with the incompressible fluid 29 inside (e.g. water or another liquid), preferably by means of a screw cap, and is then ready to be used by dispensing the fluid contained therein. A finished container produced by means of the preferred embodiment is depicted in FIG. 5 where the cap has been omitted for the sake of clarity.

Of course, the invention is not limited to the embodiment described above and shown in the accompanying drawing. Modifications remain possible, particularly as to the construction of the various elements or by substitution of technical equivalents, without thereby departing from the scope of protection of the invention. Accordingly, the scope of this disclosure is intended to be exemplary rather than limiting, and the scope of the invention is defined by any claims that stem at least in part from this disclosure.

The invention claimed is:

1. A process for the manufacturing and filling of plastic containers comprising the steps of:
   heating a localized zone of a stretchable portion of a preform to a temperature closer to its vitreous transition temperature (Tg) than to ambient temperature while maintaining at least a portion of the stretchable portion of the preform at a temperature closer to ambient temperature than to the vitreous transition temperature (Tg);
   positioning the preform in a mold assembly of two or more components while still having the heated localized zone and a portion of the stretchable portion at a temperature closer to ambient temperature, the preform being fabricated from a plastic and being provided with a longitudinal axis and including the stretchable portion and a non-stretchable portion;
   after positioning the preform in the mold assembly while still having the heated localized zone and a portion of the stretchable portion at a temperature closer to ambient temperature, initially stretching the preform along its longitudinal axis;
   injecting a fluid into the interior volume of the preform, the fluid being under such pressure so as to cause the preform to plastically deform until achieving a container of a desired size and shape; and
   releasing the container formed from the preform from the mold assembly and sealing the container.

2. The process of claim 1, wherein the fluid is an incompressible fluid.

3. The process of claim 1, wherein the preform is fabricated from a thermoplastic resin.

4. The process of claim 1, wherein the step of stretching the preform and injecting the fluid are performed substantially sequentially.

5. The process of claim 1, wherein the step of injecting the fluid starts before the end of the step of stretching the preform.

6. The process of claim 1, wherein the steps of stretching the preform and injecting the fluid are performed substantially simultaneously.

7. The process of claim 1, wherein the fluid which is injected into the preform to form the container is enclosed within and distributed with the container.

8. The process of claim 1 wherein the fluid is at ambient temperature.

9. The process of claim 1, wherein at least 50% of the stretchable portion of the preform is at a temperature closer to ambient temperature than to its vitreous transition temperature (Tg).

10. The process of claim 1, further comprising the step of monitoring of a stretching element position, volumetric flow rate of the fluid, fluid pressure, stretching element force, and deformation pattern during the molding process; and adjusting the stretching element position and the volumetric flow rate of the fluid according to a predetermined relationship, the relationship being configured to optimize manufacture of the particular variety of container being manufactured.

11. The process of claim 10, wherein the fluid is an incompressible fluid.

12. The process of claim 1, further comprising the step of maintaining the portion of the stretchable portion that is at a temperature closer to ambient temperature than to the vitreous transition temperature (Tg) at a temperature closer to ambient temperature than to the vitreous transition temperature (Tg) during the entire manufacturing and filling process.

13. The process of claim 1, wherein the portion of the stretchable portion that is at a temperature closer to ambient temperature than to the vitreous transition temperature is at about and above ambient temperature.

14. A system for the manufacturing and filling of plastic containers, the system comprising:
- a mold assembly of two or more components;
- a preform positioned in the mold assembly, the preform being fabricated from a plastic and including a non-stretchable portion and a stretchable portion defining a longitudinal axis, while positioned in the mold assembly the preform having a localized zone in the stretchable portion at a temperature closer to a vitreous transition temperature (Tg) of the preform than to ambient temperature, while positioned in the mold assembly the preform also having at least a portion of the stretchable portion at a temperature closer to ambient temperature than to the vitreous transition temperature ($T_g$);
- a stretching element moveable to initially stretch the preform along its longitudinal axis while the preform has the localized zone at a temperature closer to the vitreous transition temperature (Tg) than to ambient temperature and has the portion of the stretchable portion at the temperature closer to ambient temperature than the vitreous transition temperature ($T_g$);
- a nozzle configured to inject a fluid into the preform, the fluid being under such pressure as to cause the preform to plastically deform until achieving a container of a desired size and shape;
- a release member for releasing the container from the mold assembly; and
- a sealing member for sealing the container.

15. The system of claim 14, wherein the fluid is an incompressible fluid.

16. The system of claim 14, wherein the portion of the stretchable portion that is at a temperature closer to ambient temperature than to the vitreous transition temperature is at about and above ambient temperature.

* * * * *